(12) United States Patent
Yoshida

(10) Patent No.: US 9,452,710 B2
(45) Date of Patent: Sep. 27, 2016

(54) INDOOR ILLUMINATING DEVICE

(71) Applicant: Yazaki Corporation, Minato-ku, Tokyo (JP)

(72) Inventor: Kosuke Yoshida, Makinohara (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 82 days.

(21) Appl. No.: 14/524,194

(22) Filed: Oct. 27, 2014

(65) Prior Publication Data

US 2015/0043232 A1 Feb. 12, 2015

Related U.S. Application Data

(63) Continuation of application No. PCT/JP2013/061694, filed on Apr. 15, 2013.

(30) Foreign Application Priority Data

Apr. 27, 2012 (JP) ................. 2012-104010

(51) Int. Cl.
*B60Q 1/00* (2006.01)
*B60Q 3/02* (2006.01)
*F21V 23/00* (2015.01)
(Continued)

(52) U.S. Cl.
CPC ........... *B60Q 3/0203* (2013.01); *F21V 23/002* (2013.01); *F21W 2101/08* (2013.01); *F21Y 2101/02* (2013.01)

(58) Field of Classification Search
CPC . B60Q 3/0203; B60Q 3/0209; F21V 23/002; F21V 23/02; F21W 2101/08; F21Y 2101/02

USPC ........................................... 362/488
See application file for complete search history.

(56) References Cited

U.S. PATENT DOCUMENTS

| 7,093,964 B2 | 8/2006 | Bynum |
| 7,307,391 B2 | 12/2007 | Shan |
| 8,534,882 B2 | 9/2013 | Ohtsuka et al. |

(Continued)

FOREIGN PATENT DOCUMENTS

| CN | 101356858 A | 1/2009 |
| CN | 101791960 A | 8/2010 |

(Continued)

OTHER PUBLICATIONS

Jul. 10, 2013—International Search Report and Written Opinion—Int'l App PCT/JP2013/061694.

(Continued)

*Primary Examiner* — Ali Alavi
(74) *Attorney, Agent, or Firm* — Banner & Witcoff, Ltd.

(57) ABSTRACT

An indoor illuminating device includes a housing that has an opening part, a light source that is accommodated in the housing by being inserted into the housing via the opening part of the housing, electric wires that are led in the housing via the opening part of the housing, and supplies electric power to the light source, and a cover that covers the opening part of the housing. A plurality of through holes are formed between the housing and the cover in a state where the cover is installed to the housing. The electric wires are drawn out from the housing via the through holes. The cover is formed with a rib to which a corrugated tube through which the electric wires are inserted is fixed by being wound with tape.

5 Claims, 10 Drawing Sheets

(51) Int. Cl.
*F21W 101/08* (2006.01)
*F21Y 101/02* (2006.01)

(56) References Cited

U.S. PATENT DOCUMENTS

| | | |
|---|---|---|
| 2006/0092659 A1 | 5/2006 | Bynum |
| 2007/0064450 A1 | 3/2007 | Chiba et al. |
| 2007/0183156 A1 | 8/2007 | Shan |
| 2010/0019689 A1 | 1/2010 | Shan |
| 2010/0195348 A1 | 8/2010 | Ohtsuka et al. |
| 2010/0210133 A1* | 8/2010 | Mochizuki ............ F21S 48/212 439/421 |
| 2010/0226140 A1* | 9/2010 | Mochizuki ........... B60Q 3/0203 362/373 |
| 2012/0051064 A1 | 3/2012 | Schevardo et al. |
| 2012/0319582 A1 | 12/2012 | Shan |
| 2014/0176009 A1 | 6/2014 | Shan |
| 2015/0091471 A1 | 4/2015 | Shan |

FOREIGN PATENT DOCUMENTS

| | | |
|---|---|---|
| JP | 2005-011729 A | 6/2002 |
| JP | 2005-011729 A | 1/2005 |
| JP | 2008-517832 A | 5/2008 |
| JP | 2010-208432 A | 9/2010 |

OTHER PUBLICATIONS

Nov. 4, 2015—(CN) Notification of the First Office Action—App 201380021802.4.
Dec. 9, 2014—(DE) Office Action—App 112013002231.1.
Mar. 29, 2016—(JP) Notification of Reasons for Refusal—App 2012-104010.
Jun. 14, 2016—(JP) Notification of Reasons for Refusal—App 2012-104010.

* cited by examiner

INDOOR ILLUMINATING DEVICE

CROSS REFERENCE TO RELATED APPLICATIONS

This application is a continuation of PCT application No. PCT/JP2013/061694, which was filed on Apr. 15, 2013 based on Japanese Patent Application (No. 2012-104010) filed on Apr. 27, 2012, the contents of which are incorporated herein by reference.

BACKGROUND OF THE INVENTION

1. Field of the Invention

The present invention relates to an indoor illuminating device which is attached to the ceiling of a vehicle or the like and illuminates the indoor space.

2. Description of the Related Art

An indoor illuminating device for illuminating an indoor space is attached to the ceiling of a vehicle such as an automobile (refer to PTL 1 and 2).

As shown in FIG. 9, an indoor illuminating device 1 has a housing 3 to which a bulb 2 is attached, a cover 4 which is assembled to the housing 3, and electric wires 5 which are connected to a bus bar in the housing 3, and the electric wires 5 are drawn outwards from a gap between the housing 3 and the cover 4.

PTL 1 JP-A-2010-208432
PTL 2 JP-A-2008-517832

SUMMARY OF THE INVENTION

In the indoor illuminating device 1 as described above, the electric wires 5 are laterally drawn out from the gap between the housing 3 and the cover 4. Thus, when the indoor illuminating device 1, for which the electric wires are drawn out to a limited direction, is attached to a ceiling or the like, as shown in FIG. 10A, a component 6 at the side of the vehicle and the electric wires 5 may interfere. In such a case, as shown in FIG. 10B, to avoid the interference of the component 6 at the side of the vehicle and the electric wires 5, the attaching position has to be changed.

That is, the indoor illuminating device 1, for which the position where the electric wires 5 are drawn out is limited, must be arranged in accordance with peripheral components, and attaching position is limited.

The present invention is made in view of the above described circumstances, and the object of the present invention is to provide an indoor illuminating device which can be attached with high degree of freedom.

To achieve the previously described object, the indoor illuminating devices of the present invention are characterized in the following (1) to (2).

(1) An indoor illuminating device including a housing that has an opening part, a light source that is accommodated in the housing by being inserted into the housing via the opening part of the housing, electric wires that are led in the housing via the opening part of the housing, and supplies electric power to the light source, and a cover that covers the opening part of the housing. A plurality of through holes are formed between the housing and the cover in a state where the cover is installed to the housing. The electric wires are drawn out from the housing via the through holes. The cover is formed with a rib to which a corrugated tube through which the electric wires are inserted is fixed by being wound with tape.

(2) The indoor illuminating device of (1), wherein the cover is installable to the housing in both a regular state and an upside down state, wherein the cover is formed with the rib at a position away from a central part of the cover, and wherein a corrugated tube through which the electric wires are inserted is fixed to the rib by being wound with tape.

With the indoor illuminating device of the construction of the above (1), the electric wires can be drawn out to the same direction selectively from the plurality of through holes which are provided at different positions. Thereby, even if the electric wires interfere with a component at the side of a vehicle when the indoor illuminating device is attached to the ceiling of the vehicle or the like, by drawing out the electric wires from another through hole, the interference of the component at the side of the vehicle with the electric wires can be avoided without changing the attaching position. That is, the degree of freedom of the attaching position can be largely improved.

With the indoor illuminating device of the construction of the above (2), by winding the corrugated tube, which protects the electric wires, to the rib of the cover with tape, the corrugated tube can be fixed to the cover easily. Besides, the position where the rib fixes the corrugated tube also can be changed easily by turning the cover upside down to be installed to the housing. Thereby, the degree of freedom of the attaching position can be further improved.

According to the present invention, the indoor illuminating device which can be attached with high degree of freedom can be provided.

The present invention has been briefly described above. Further, details of the invention will become more apparent after the embodiments of the invention described below are read with reference to the accompanying figures.

BRIEF DESCRIPTION OF THE DRAWINGS

FIGS. 7A and 7B are figures which show the shape of the cover, in which FIG. 7A is a front view of the cover, and FIG. 7B is a top view of the cover.

FIGS. 10A and 10B are figures which show a problem in the traditional indoor illuminating device, in which FIG. 10A and FIG. 10B are schematic top views of the indoor illuminating device, respectively.

DETAILED DESCRIPTION OF THE EXEMPLARY EMBODIMENTS

Below, an embodiment of the invention is described with reference to the figures.

Figure 1:
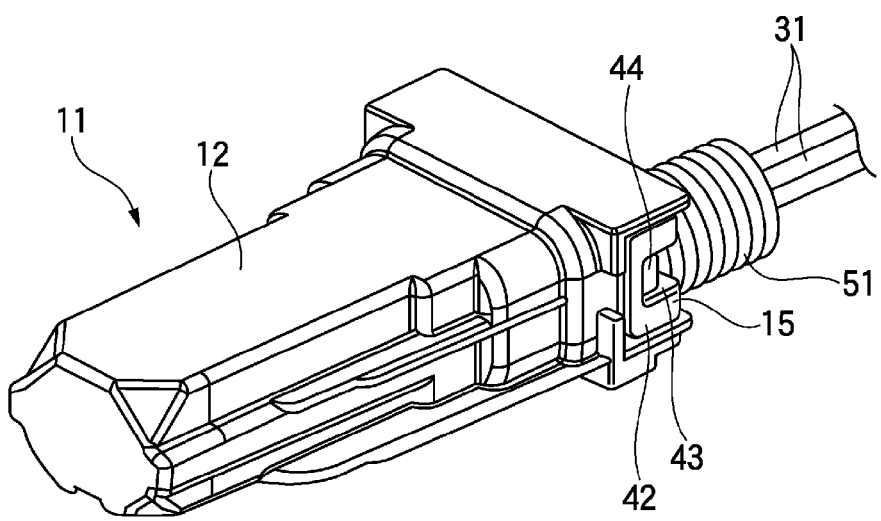
FIG. 1 is a perspective view which shows the appearance of an indoor illuminating device according to the present embodiment.
Figure 2:
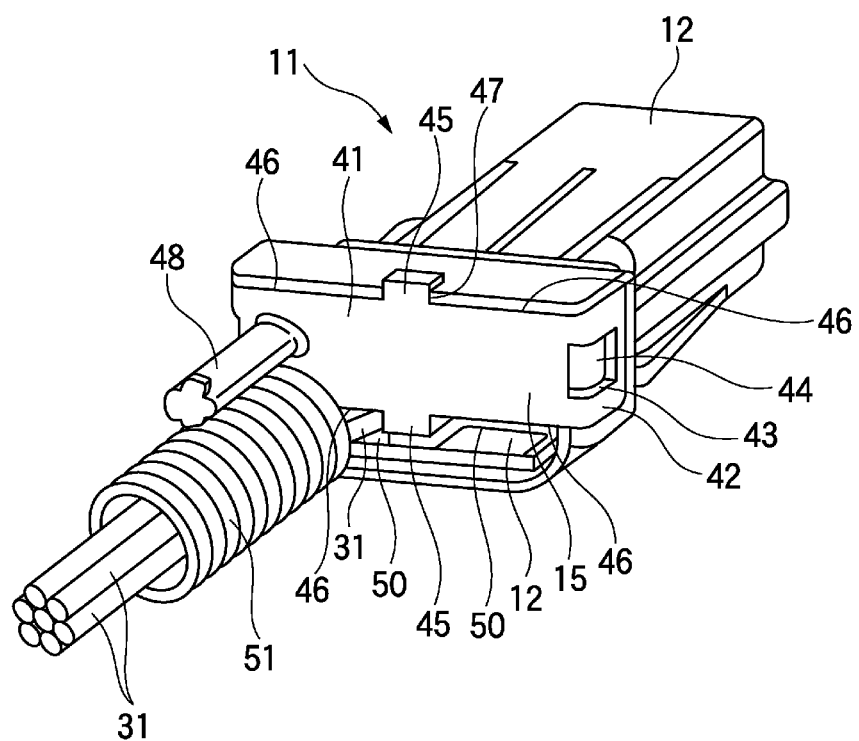
FIG. 2 is a perspective view, which is viewed from the back side and which shows the appearance of the indoor illuminating device according to the present embodiment.
Figure 3:
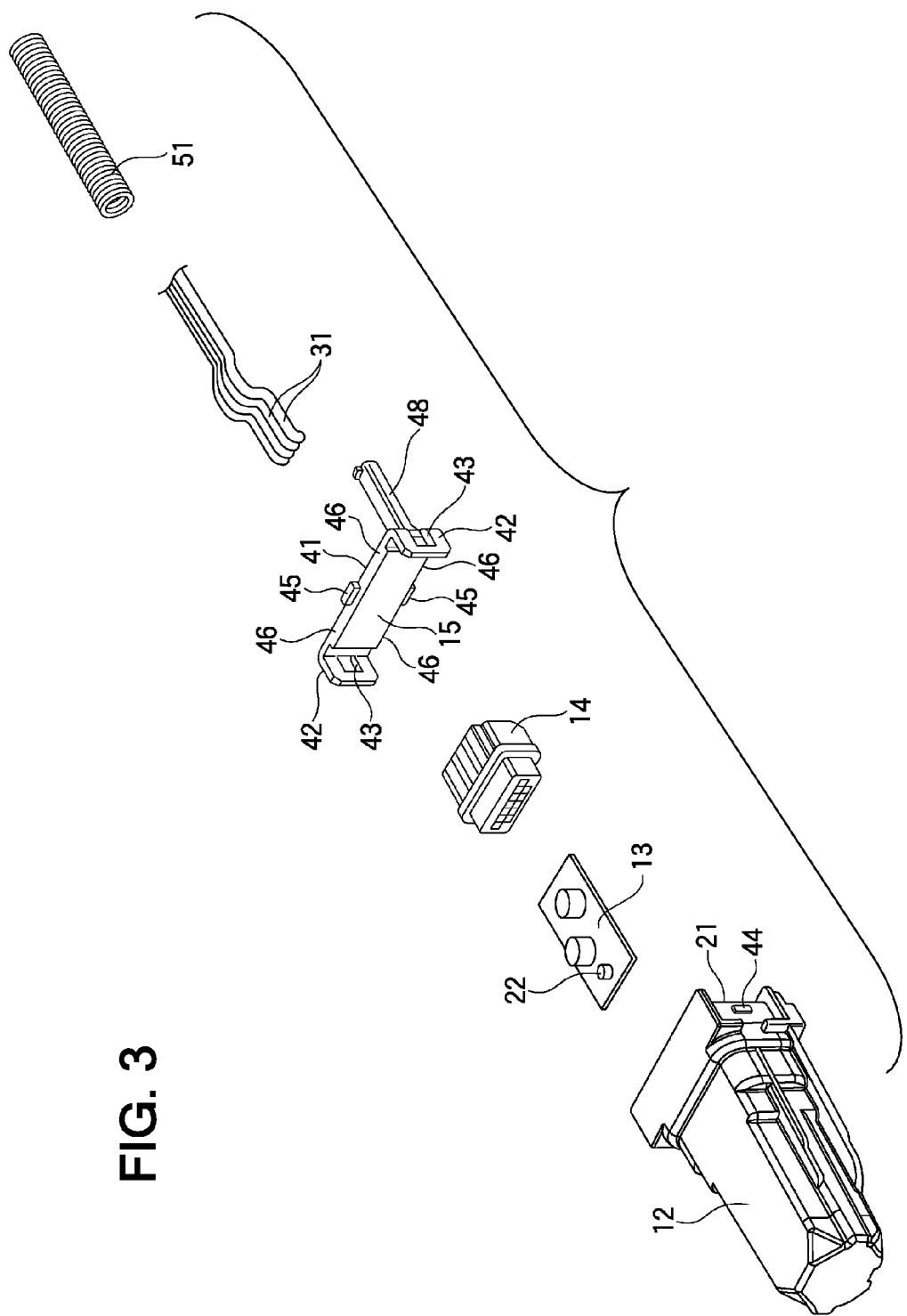
FIG. 3 is an exploded perspective view of the indoor illuminating device according to the present embodiment.
Figure 4:
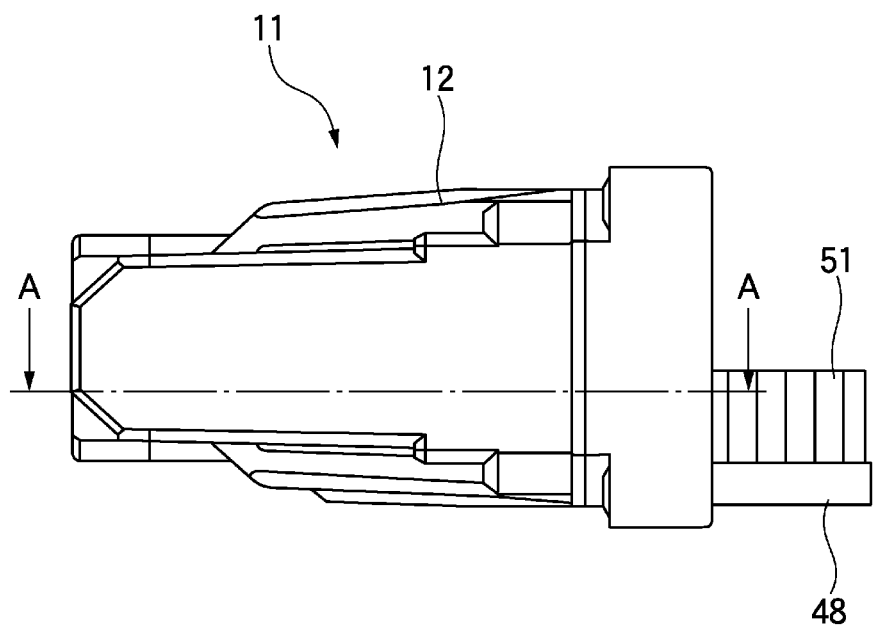
FIG. 4 is a top view of the indoor illuminating device according to the present embodiment.
Figure 5:
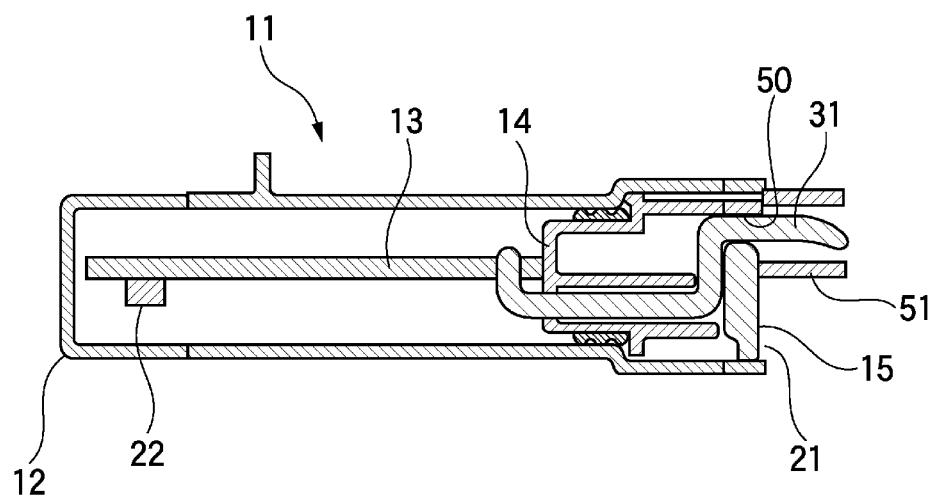
FIG. 5 is an A-A sectional view in FIG. 4.
Figure 6:
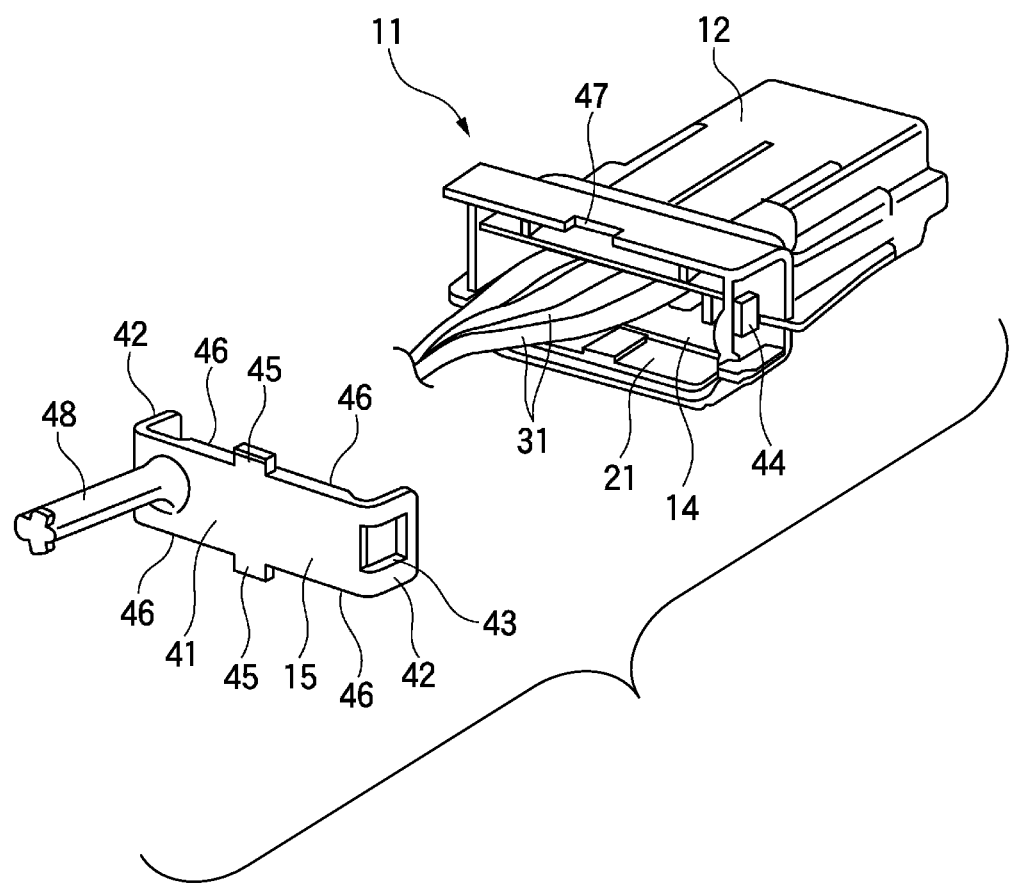
FIG. 6 is a perspective view which is viewed from the back side in a state that a cover is removed from a housing of the indoor illuminating device according to the present embodiment.
Figure 7A:
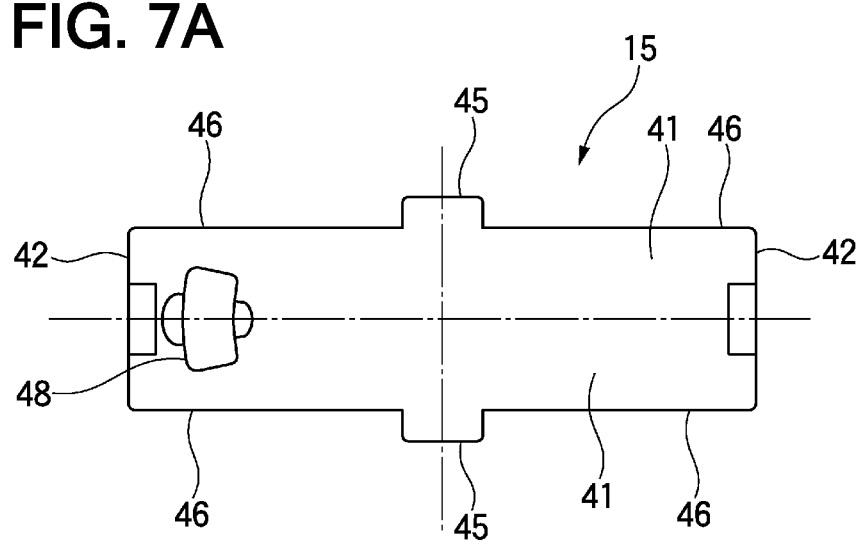
Figure 7B:
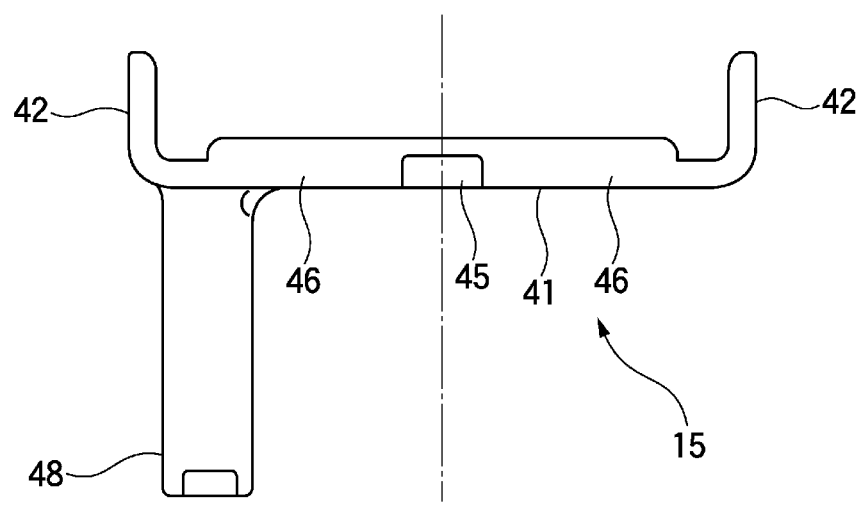
Figure 8:
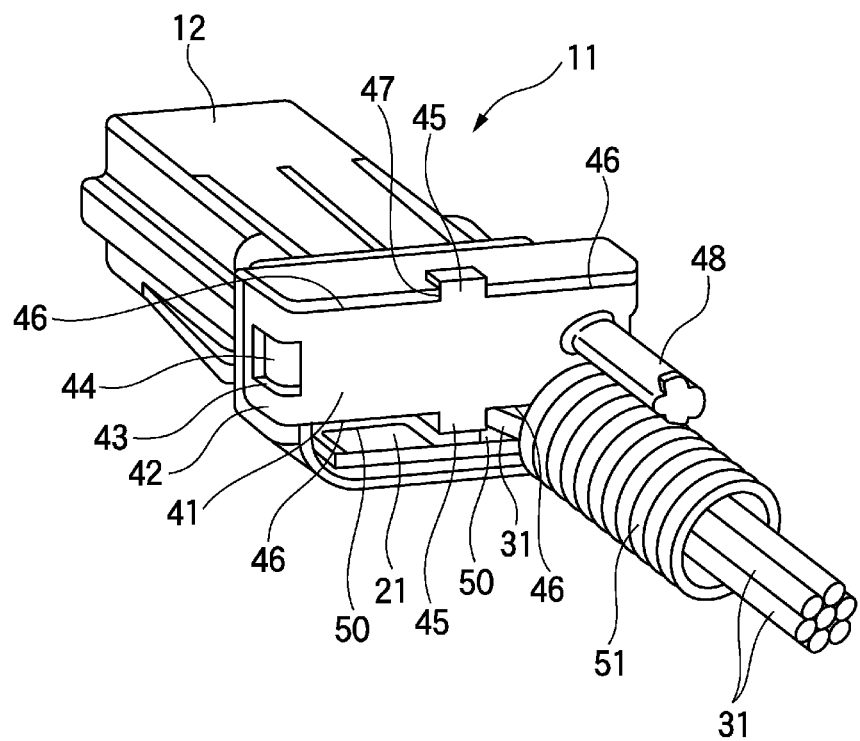
FIG. 8 is a perspective view, which is viewed from the back side, of the indoor illuminating device which is in a state that the cover is attached by changing the direction of the cover.
Figure 9:
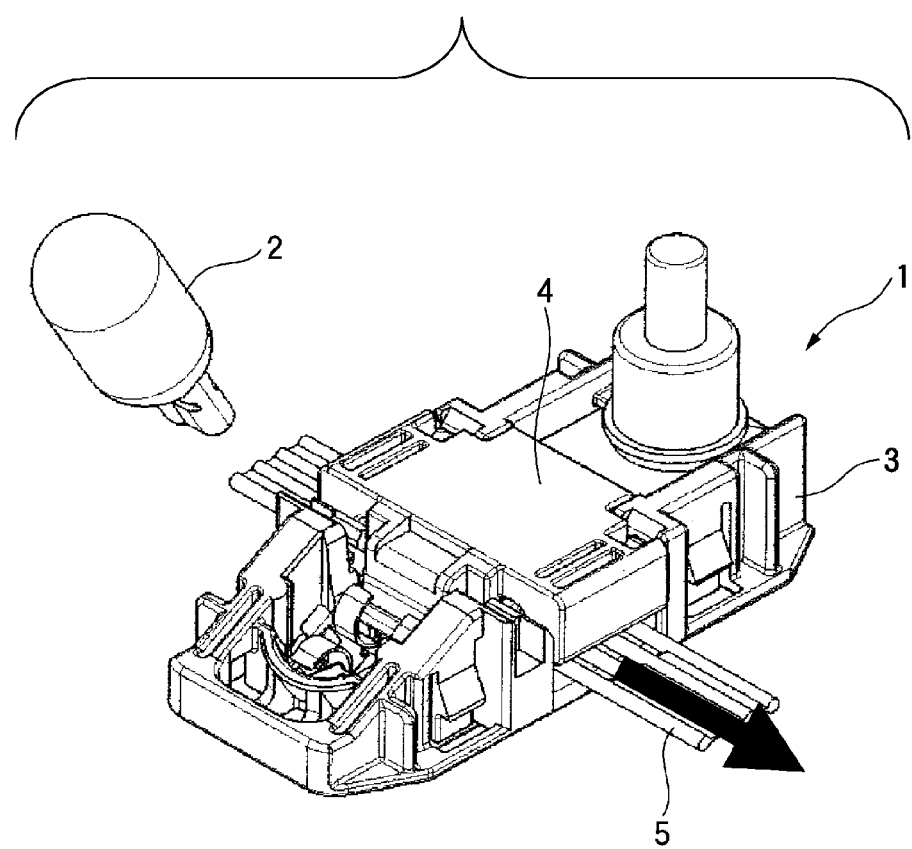
FIG. 9 is a perspective view which shows a traditional example of an indoor illuminating device.
Figure 10A:
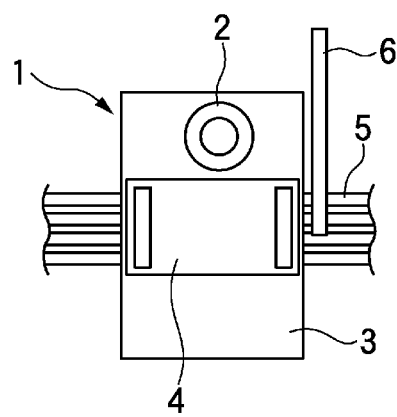
Figure 10B:
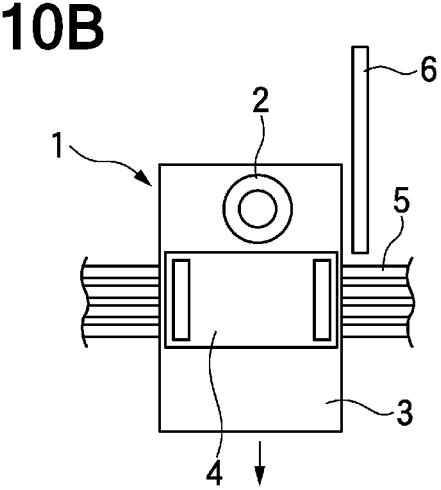

FIG. 1 is a perspective view which shows the appearance of an indoor illuminating device according to the present embodiment. FIG. 2 is a perspective view, which is viewed from the back side and which shows the appearance of the indoor illuminating device according to the present embodiment. FIG. 3 is an exploded perspective view of the indoor illuminating device according to the present embodiment. FIG. 4 is a top view of the indoor illuminating device according to the present embodiment. FIG. 5 is an A-A sectional view in FIG. 4. FIG. 6 is a perspective view which is viewed from the back side in a state that a cover is removed from a housing of the indoor illuminating device according to the present embodiment. FIGS. 7A and 7B are figures which show the shape of the cover, in which FIG. 7A is a front view of the cover, and FIG. 7B is a top view of the cover. FIG. 8 is a perspective view, which is viewed from the back side, of the indoor illuminating device which is in a state that the cover is attached by changing the direction of the cover.

As shown in FIGS. 1 to 5, an indoor illuminating device 11 according to the present embodiment includes a housing 12, a circuit board 13, a holder 14 and a cover 15. The housing 12 is formed of resin materials having translucency, and an opening part 21 is formed at the back end of the housing 12.

For example, a light source 22 such as an LED (Light Emitting Diode) is mounted onto the circuit board 13, and when the light source 22 emits light, the light of the light source 22 is irradiated from the housing 12 and illuminates the indoor room of a vehicle.

The circuit board 13 is fixed to the holder 14 which is formed of synthetic resins such as plastic. The circuit board 13, which is provided with the light source 22, is arranged in the housing 12 when the circuit board 13 is inserted from the opening part 21 of the housing 12, and the holder 14 is assembled to the opening part 21 of the housing 12.

A plurality of electric wires 31 are connected to the circuit board 13, for example, by being soldered, and electric power is supplied to the light source 22 from the electric wires 31. These electric wires 31 are held in the holder 14, and are drawn out backwards from the opening part 21 of the housing 12.

The cover 15 is installed to the opening part 21 at the back end side of the housing 12.

The cover 15 is formed of synthetic resins such as plastic, and by installing the cover 15 to the opening part 21, the holder 14, to which the circuit board 13 is fixed, and the electric wires 31 are fixed to the housing 12, and the opening part 21 of the housing 12 is also closed.

As shown in FIGS. 6, 7A and 7B, the cover 15 has a board-like part 41 which covers the opening part 21, and locking pieces 42 which are formed at two ends of the board-like part 41. These locking pieces 42 are extended towards the direction of installing to the housing 12, and locking holes 43 are formed in the locking pieces 42, respectively. Locking claws 44 are formed on two side surfaces at the back end side of the housing 12, and these locking claws 44 are engaged in the locking holes 43 of the locking pieces 42. Thereby, the cover 15 is attached to the housing 12.

Upper and lower convex parts 45 are formed at the central part of the board-like part 41 on the cover 15. The two sides of the convex parts 45 in the board-like part 41 become notch parts 46, respectively.

A concave engaging part 47 is formed at the upper part of the central part of the opening part 21 of the housing 12, and the upper convex part 45 of the cover 15, which is installed to the opening part 21, is inserted into the concave engaging part 47.

When the cover 15 is attached to the housing 12, at the lower side of the opening part 21, two long, narrow through holes 50, which are partitioned by the convex part 45 of the cover 15, are formed at the right and left sides between the opening part 21 of the housing 12 and the notch parts 46 of the cover. These through holes 50 have a width which is slightly larger than the diameter of the electric wires 31, and the electric wires 31 is insertable into these through holes 50 in a state where the electric wires 31 are arranged in a predetermined direction. The predetermined direction may be a direction perpendicular to an extending direction of the electric wires 31. The electric wires 31 are inserted through one of these through holes 50, and the electric wires 31 drawn out from the through hole 50 pass through a corrugated tube 51 and are protected by this corrugated tube 51. The corrugated tube 51 is formed of synthetic resin, and can be easily bent by being longitudinally provided with concave and convex parts that are formed circularly.

A rib 48 is formed on the board-like part 41 of the cover 15 at the side opposite to the side of installing to the housing 12. The rib 48 is formed at a position which is displaced to one side from the center of the board-like part 41 in the length direction.

An end of the corrugated tube 51 is placed adjacent to the rib 48, and the end of the corrugated tube 51 is fixed to the cover 15 when the corrugated tube 51 and the rib 48 are wound with tape together.

The part of the cover 15 except the rib 48 has a left-right and up-down symmetric shape. Therefore, the cover 15 can be installed to the opening part 21 of the housing 12 by being turned upside down.

The indoor illuminating device 11 of the above structure enables the electric wires 31 to be drawn out to the same direction from the plurality of through holes 50 formed at different positions by installing the cover 15 to the housing 12.

Therefore, even if the electric wires 31 may interfere with a component at the side of the vehicle when the indoor illuminating device 11 is attached to the ceilings of the vehicle or the like, by drawing out the electric wires 31 from another through hole 50, the interference with the component at the side of the vehicle can be avoided very easily.

As shown in FIG. 8, if the cover 15 is turned upside down by being rotated 180 degrees to be attached to the housing 12, the position of the rib 48 can be arranged to the opposite side in the horizontal (left-right) direction. Thereby, the fixed position of the corrugated tube 51 also can be changed easily.

Thus, according to the indoor illuminating device 11 of the above embodiment, the electric wires 31 can be draw out to the same direction selectively from the plurality of through holes 50 which are provided at different positions. Thereby, even if the electric wires 31 interfere with a component at the side of the vehicle when the indoor illuminating device 11 is attached to the ceiling of the vehicle or the like, by drawing out the electric wires 31 from another through hole 50, the interference of the component at the side of the vehicle with the electric wires 31 can be avoided without changing the attaching position. That is, the degree of freedom of the attaching position can be largely improved.

By winding the corrugated tube 51, which protects the electric wires 31, to the rib 48 of the cover 15 with tape, the corrugated tube 51 can be fixed to the cover 15 easily.

Besides, the position where the rib 48 fixes the corrugated tube 51 also can be changed easily by turning the cover 15 upside down to be installed to the housing 12. Thereby, the degree of freedom of the attaching position can be further improved.

The present invention is not limited to the above described embodiment, and suitable modifications, improvements or the like can be made. Moreover, the materials, shapes, dimensions, numbers, installation places, and the like of the components in the above embodiment are arbitrarily set as far as the invention can be attained, and not particularly restricted.

There is provided an indoor illuminating device capable of being attached with high degree of freedom.

What is claimed is:

1. An indoor illuminating device comprising:
   a housing that has an opening part;
   a light source that is accommodated in the housing by being inserted into the housing via the opening part of the housing;
   electric wires that are led into the housing via the opening part of the housing, and supply electric power to the light source; and
   a cover that covers the opening part of the housing,
      wherein a plurality of through holes are formed between the housing and the cover in a state where the cover is installed to the housing,
      wherein the electric wires are drawn out from the housing via the through holes, and
      wherein the cover includes a rib to which a corrugated tube is fixed by being wound with tape, the corrugated tube having the electric wires extending therethrough.

2. The indoor illuminating device according to claim 1, wherein the through holes are configured to lead the electric wires from the housing in a same direction at a different position.

3. An indoor illuminating device comprising:
   a housing that has an opening part;
   a light source that is accommodated in the housing by being inserted into the housing via the opening part of the housing;
   electrical wires that are led into the housing via the opening part of the housing, and supply electrical power to the light source; and
   a cover that covers the opening part of the housing, the cover including a convex portion protruding therefrom,
      wherein a plurality of through holes are formed between the housing and the cover in a state where the cover is installed to the housing, the plurality of through holes being partitioned by the convex portion,
      wherein the electrical wires are drawn out from the housing via the through holes, and
      wherein the cover includes a rib to which a corrugated tube is fixed by being wound with tape, the corrugated tube having the electrical wires extending therethrough.

4. An indoor illuminating device comprising:
   a housing that has an opening part;
   a light source that is accommodated in the housing by being inserted into the housing via the opening part of the housing;
   electric wires that are led into the housing via the opening part of the housing, and supply electric power to the light source; and
   a cover that covers the opening part of the housing,
      wherein a plurality of through holes are formed between the housing and the cover in a state where the cover is installed to the housing,
      wherein the electric wires are drawn out from the housing via the through holes,
      wherein the cover includes a rib to which a corrugated tube is fixed by being wound with tape, the corrugated tube having the electric wires extending therethrough, and the cover is formed with the rib at a position away from a central part of the cover, and
      wherein the cover is installable to the housing in both a regular state and an upside down state.

5. The indoor illuminating device of claim 4, wherein the through holes are configured to lead the electric wires from the housing in a same direction at a different position.

* * * * *